(No Model.)

F. BECKER.

ORNAMENTAL CHAIN AND METHOD OF MAKING THE SAME.

No. 301,661. Patented July 8, 1884.

WITNESSES:
C. H. Leuther Jr.
Jno. L. Cowdon

INVENTOR:
Frank Becker
by Joseph A. Miller & Co
Atty's

UNITED STATES PATENT OFFICE.

FRANK BECKER, OF ATTLEBOROUGH FALLS, MASSACHUSETTS, ASSIGNOR TO R. F. SIMMONS & CO., OF SAME PLACE.

ORNAMENTAL CHAIN AND METHOD OF MAKING THE SAME.

SPECIFICATION forming part of Letters Patent No. 301,661, dated July 8, 1884.

Application filed May 10, 1884. (No model.)

*To all whom it may concern:*

Be it known that I, FRANK BECKER, of Attleborough Falls, in the county of Bristol and State of Massachusetts, have invented certain new and useful Improvements in Ornamental Chains and Method of Making the Same, of which the following is a full, clear, and exact description, reference being had to the accompanying drawings, forming a part of this specification.

My invention relates to that class of ornamental chains which are designed for watch, locket, guards, and other ornamental purposes, &c., and which are composed of burnished links alternating or otherwise associated with unburnished links.

The object of my invention is to so construct the chain that the burnished links may be burnished together by machinery without affecting the links which are to remain unburnished.

To the above ends my invention consists in the peculiar and novel construction of the chain, and in the peculiar and novel method of making the same, as hereinafter more fully described and claimed.

Previous to my invention, in those chains which are composed of burnished links associated with unburnished links, the links to be burnished were operated upon by hand after having been put into the chain, and this operation was very costly, as it necessitated the employment of skilled labor. Furthermore, the unburnished links had to be covered with jewelers' wax, the application and removal of which involved the application of heat, which, together with the heat from the soldering, softened the links, causing them to pull out of shape. My invention remedies all of these defects.

In order that my invention may be fully understood, I will proceed to describe it with reference to the accompanying drawings, in which—

Figure 1:
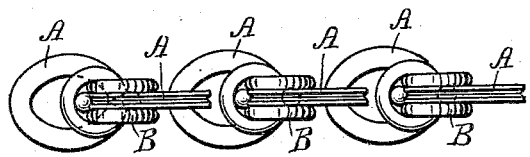
Figure 2:
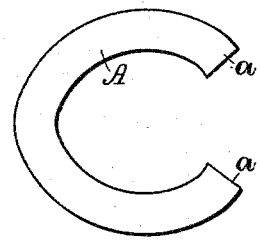
Figure 3:
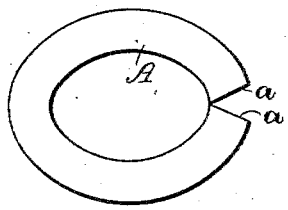
Figure 4:
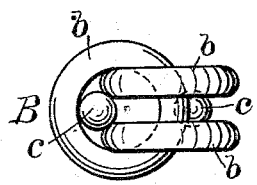

Figure 1 is a view in elevation of a section of my improved chain. Fig. 2 is a side view of one of the burnished links in open condition. Fig. 3 is a similar view of the same in closed condition. Fig. 4 is a detached view of one of the unburnished links.

In the said drawings, A designates the burnished links, and B the unburnished links. The links A may be of either the precise general form shown, or of any other suitable or preferred form; but in any event each of said links is formed at its meeting ends with the oblique cuts *a a*, so that when closed there shall be a triangular or wedge-shaped space between the outer corners of the meeting ends of the link. The links B are each composed of four rings, *b*, interlocking in pairs, as shown in Fig. 4, (said figure actually showing but three of the four rings, but the true number being evident.)

*c* designates a ball which is soldered between the pair of rings *b*, as shown in Fig. 4, there being two such balls for each link B, each ball uniting two of the rings. Now, the links A are all burnished before being placed in the chain. After being so burnished, the links A are each opened, as shown in Fig. 2, and the open ends of the links A are inserted into the links B in such manner that when the ends of the links A are closed, as shown in Fig. 3, the balls *c* shall lie partially within the wedge-shaped space above mentioned. The ball *c* prevents any longitudinal movement of the link A, while the two rings *b* of the link B, which embrace the sides of the link A, prevent any lateral movement of said link. Thus the link B, with its two links A, become rigidly connected and are virtually one link, the flexibility of the chain being due to the movements of the interlocking links A. This construction is particularly valuable in the case of plated chains in which the links B are plated, because, since the links A are burnished or polished before being placed in the chain, no removal of the plating upon the links B results from the burnishing or polishing process.

In lieu of the balls *c*, blocks or pieces of other suitable form may be used, and the triangular cuts *a a* may be replaced by simple straight cuts, or cuts of such form as to receive the pieces which serve to unite the rings *b* and prevent lateral movement between the contiguous links A and B.

Having thus described my invention, I claim as new and desire to secure by Letters Patent—

1. The chain herein described, composed of the burnished links A, having the oblique cuts $a\ a$, and the links B, constructed as described, and provided with the balls $c$.

2. An ornamental chain composed of a series of interlocked links, A A, and groups of rings B, arranged to secure the open ends of the links A A without solder, as described.

3. The method herein described for forming ornamental chains, the same consisting in uniting the links without solder and securing the same by a series of rings secured together by solder, as described.

FRANK BECKER.

Witnesses:
M. F. BLIGH,
J. A. MILLER, Jr.